United States Patent

[11] 3,552,607

[72] Inventors Edgar Burley Edwards
Warren, Pa.;
Rudolf Karl Andrew Kreidel, Norwalk, Conn.
[21] Appl. No. 743,115
[22] Filed July 8, 1968
[45] Patented Jan. 5, 1971
[73] Assignee Techs Incorporated
Warren, Pa.
a corporation of Delaware

[54] POUR-SPOUT CLOSURE FOR PLASTIC CONTAINER
10 Claims, 4 Drawing Figs.

[52] U.S. Cl. ................................................. 222/566
[51] Int. Cl. ................................................. B65d 5/74
[50] Field of Search ..................................... 222/570,
107, 92, 591, 566; 239/23, 27; 220/63, 39, 65; 229/14B

[56] References Cited
UNITED STATES PATENTS

| | | | |
|---|---|---|---|
| 1,960,393 | 5/1934 | Otten | 222/92 |
| 2,941,694 | 6/1960 | Harman | 222/107 |
| 3,118,573 | 1/1964 | Johnson | 222/541X |
| 3,124,282 | 3/1964 | Winstead | 222/107X |
| 3,148,803 | 9/1964 | Geyer | 222/541X |
| 2,476,446 | 7/1949 | Lindell | 222/107 |
| 2,552,318 | 5/1951 | Hartmann | 222/570X |
| 2,652,172 | 9/1953 | Negola | 220/63 |
| 2,873,052 | 2/1959 | Atherton | 222/570 |
| 3,138,293 | 6/1964 | Roak et al. | 229/14X |
| 3,240,404 | 3/1966 | Porter et al. | 222/570X |

*Primary Examiner*—Stanley H. Tollberg
*Assistant Examiner*—Norman L. Stack, Jr.
*Attorney*—Beale and Jones

ABSTRACT: A thin-walled plastic inner container or liner is provided for use with a fiber or steel protective outer container. The wall is uniformly thin and the liner may be blow molded. It is desired to place the outlet in the end and adjacent a corner or a side to permit ease of pouring from the container. A neck is molded with the thin walled liner and is approximately of the same thickness. It has a first frustoconical portion integral with container and an outer frustoconical portion to the latter of which is attached the pour-spout that may have a removable screw cap closure. The outer neck portion has a frustoconical inward taper of about 1½° from bottom to top. An annular nozzle member or pour-spout has an outer wall that is frustoconical with an approximate 1½° taper and its inner wall is parallel thereto. The neck portion is smaller than the pour-spout and is stretched to receive the pour-spout therein. Adjacent the upper end of the pour-spout in its outer surface is an annular recess or notch and above this recessed end is a reduced externally threaded outer end. Forced over the outer neck portion that is in place on the outside of the pour-spout is a locking-compression ring having its inner wall of frustoconical shape and like taper to the outer wall of the outer neck portion and installed pour-spout. There is an annular inwardly extending bead adjacent the upper end of the locking-compression ring and it locks the liner outer neck portion into the recess on the pour-spout. The upper end of the locking-compression ring has an outwardly extending flange that is scalloped and assists in assembly as well as positioning of the container under a filling spout for filling the container. An internally threaded closure screw cap is threadedly received on the end of the pour-spout.

PATENTED JAN 5 1971

INVENTORS
EDGAR BURLEY EDWARDS
RUDOLF KARL ANDREW KREIDEL
BY Beall and Jones
ATTORNEYS

POUR-SPOUT CLOSURE FOR PLASTIC CONTAINER

There is an economic need for plastic containers, particularly thin-wall plastic containers, for storage and shipment of liquid and certain finely powdered products. Such thin-wall plastic containers are regularly enclosed in more substantial outside containers, for instance fiber or steel overwraps, for their protection against damage incidental to shipment, thus comprising safe and dependable composite containers.

Such thin-wall containers must be made of flexible material in order to be collapsible for shipment empty and at least partially collapse incidental to the emptying process. To be economically competitive they must be made of the minimum practical amount of material, necessitating that the walls be as uniformly thin as possible and permitted under governing specifications. These requirements dictate the use of a low-density plastic material, probably blow-molded.

The problem of molding a pour-spout fitting or closure with sufficient rigidity and thickness and structural strength to maintain its roundness and threads of sufficiently precise dimensions to effect secure closure, integral with and of the same material as the container, has proved to be very difficult if not, indeed, impossible on very thin-walled containers especially in offcenter peripheral locations which are much more desirable to users for handling and pouring facility.

In order that it may have the necessary rigidity and thickness and structural strength the pour-spout fitting and its closure part, be it a screwcap or plug, must, therefore, be molded separately of a high-density, hard and glossy plastic material, the direct opposite of the type of plastic required for the thin flexible body of the container, and be attached to the body of the container by some method of sealing, for example heat sealing.

The fact that such sealing procedures have in practice proved to be expensive, difficult or impractical, and in the case of heat sealing more or less detrimental to the materials from which the parts are made, has motivated efforts to develop methods other than heat sealing, for example, mechanical methods.

The primary objective of this invention is, accordingly, to provide a simple and practical combined pour-spout and leak-proof closure for such thin-wall plastic containers.

A second objective is to provide a practical and dependable means of mechanically attaching the pour-spout fitting to the container in a leak-proof manner. This is by means of inserting a tapered nozzle into a parallel tapered neck of slightly reduced diameter that is provided integral on the container and to provide for its attachment by means of a parallel tapered locking-compression ring also made of high-density material which in addition to its function of developing the leak-proof seal with the pour-spout fitting and container or liner neck assures the maintenance of the connection between all these parts by reason of its being keyed into the pour-spout nozzle.

These and other advantages will become apparent as the features of this invention shown in the below referred to FIGS. of the drawings and the description thereof. The overall closure is completed by means of a screwcap not involved in this invention.

Throughout the description like reference numbers refer to similar parts.

A thin-walled plastic inner container or liner is illustrated at 10 having an outlet adjacent a corner which is integrally formed with the container. This outlet or neck 11 is formed with a first frustoconical portion 11a and a second or outer frustoconical portion 11b that has a taper of about 1 ½° inwardly from its bottom to top outlet. The container and outlet or neck is of thin-wall construction produced as by blow-molding or otherwise. The liner will be housed in an outer protective fiber or steel overwrap.

Figure 1:
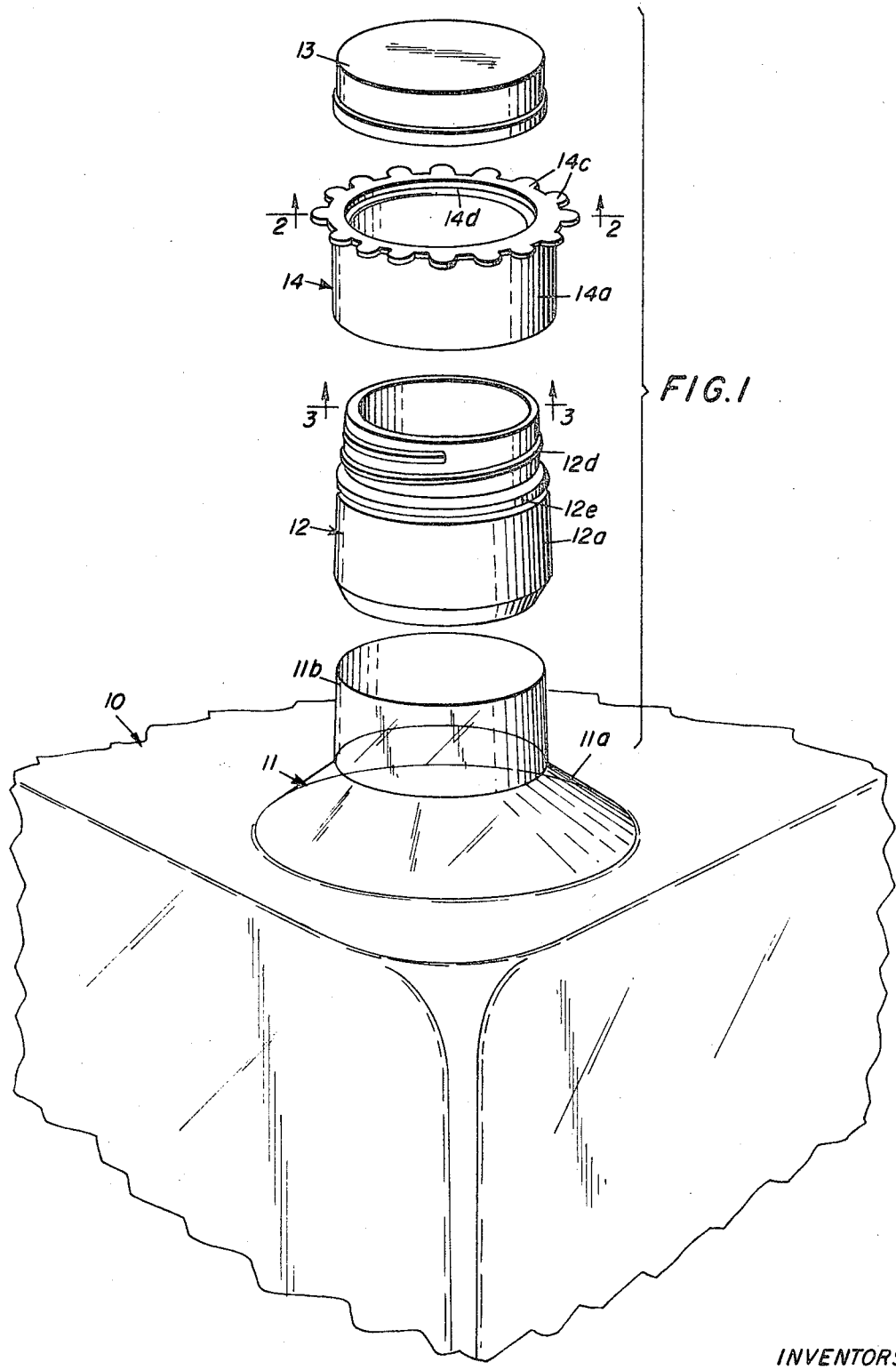
FIG. 1 is an isometric view of a container with a neck and an exploded view of a pour-spout closure for receipt on the neck.
Figure 2:
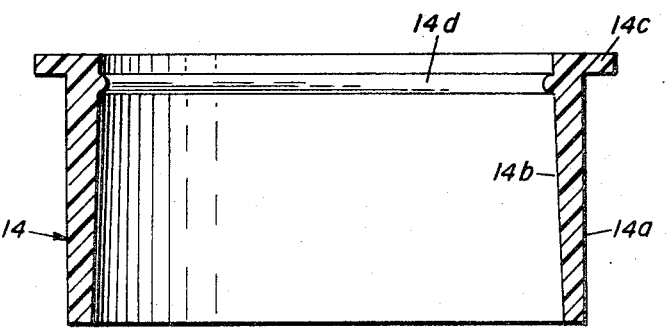
FIG. 2 is a vertical cross section of the pour-spout outer collar or locking-compression ring on an enlarged scale.
Figure 3:
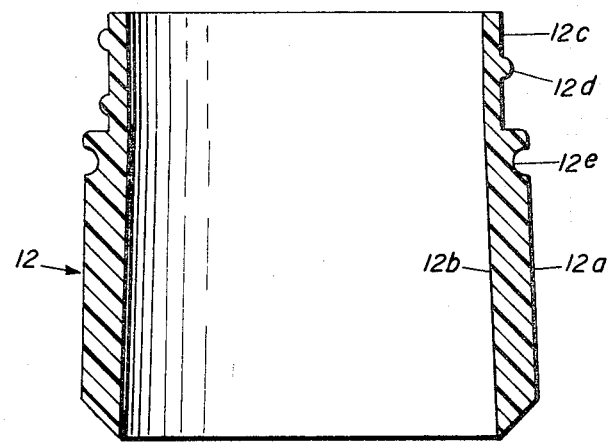
FIG. 3 is a vertical cross section of the pour-spout that fits within the neck of the container.
Figure 4:
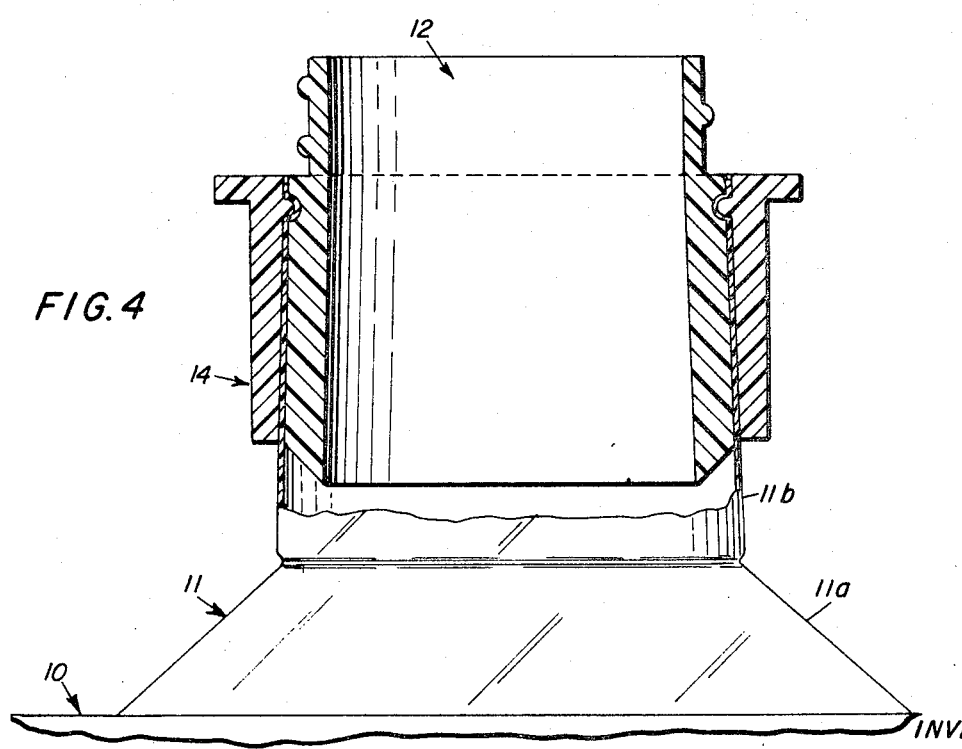
FIG. 4 is a cross-sectional view of the pour-spout of FIG. 3 received within a neck of the container with the compression ring secured about the neck and clamping it to the pour-spout therewithin.

An annular pour-spout member 12 is formed of high-density, hard and glossy plastic material. It has an outer wall that has a diameter slightly greater than the diameter of the neck portion 11b which in assembling is stretched thereover. The outer wall 12a of the pour-spout 12 has a taper of about 1 ½° inwardly from its bottom end to its top end. Its inner wall 12b may be parallel to its outer wall 12a. At the top end of the pour-spout 12 there is a reduced in diameter cylindrical integral portion 12c that has external threads 12d which receive a screwcap 13, see FIG. 1. Adjacent the upper end of the tapered portion 12b there is an annular recess 12e that serves as a locking recess for a locking compression ring 14 to be described.

The locking compression ring 14 is an annular ring whose outside wall 14a may be cylindrical. The inside wall 14b of the locking ring 14 is tapered at the same taper of the outside wall 12a of the pour-spout 12 and of a diameter to be received thereby with the neck portion 11b therebetween. This locking ring has an annular peripheral transversely extending flange 14c at its upper end that is scalloped and serves in its installation and as a positioner for the assembled container when being filled by a filling machine. There is an inwardly projecting bead 14d on the inside wall 14b adjacent the top flanged end of the locking ring 14. This bead 14d matches with the annular locking recess 12e in the outside wall 12a of the pour-spout 12 and locks the ring to the pour-spout with the neck portion 11b of the container sandwiched therebetween. The locking ring 14 is of the same material as the pour-spout 12, a high-density, hard glossy plastic material.

There has here been provided a practical pour-spout fitting for a thin-walled liner and integrally formed neck. The pour-spout forms a leak-proof seal and assures the maintenance of the connection between the parts by reason of its tight tapered fit and locking-compression ring that is forced over the liner neck and pour-spout therewithin.

We claim:

1. A closure fitting means for a thin-walled tubular neck on a thin-walled flexible container, comprising:
    a pour-spout having a body portion whose outer surface is frustoconical and a pouring end adapted to receive a closure, said body portion having a lock receiving means extending into the outer surface thereof;
    said pour-spout having an external diameter greater than said thin-walled tubular neck which is stretchably received thereover;
    a locking-compression ring having a frustoconical inner surface corresponding to the frustoconical outer surface of said pour-spout and having an inwardly projecting locking means on its inner surface for reception in said lock receiving means on the pour-spout;
    said pour-spout and locking-compression ring having their larger ends toward the container; and
    said locking-compression ring being forced onto said pour-spout body portion having the thin-walled tubular neck stretched thereover whereby there is a uniform radial compression of the thin-walled tubular neck forming a seal and whereupon the locking means thereon is received in locking engagement in said lock receiving means on the pour-spout and a leak-proof pour-spout is provided when a closure is placed on the pour-spout pouring end.

2. A closure fitting means according to claim 1 wherein said lock receiving means extending into the body portion of the pour-spout is an annular groove adjacent the outer end of the body portion of the pour-spout and wherein the locking means on the inner surface of the locking-compression ring is an annular bead adjacent the outer end of the locking ring for reception in said annular groove on the pour-spout.

3. A closure fitting means according to claim 1 wherein the pour-spout outer surface and the locking-compression ring inner surface have their frustoconical matching surfaces tapering at an angle of approximately 1 ½°.

4. A closure fitting means according to claim 1 wherein said lock receiving means on the pour-spout is positioned adjacent the end of its frustoconical body that is adjacent the pouring end of the pour-spout.

5. A closure fitting means according to claim 1 wherein the pouring end of the pour-spout is of reduced diameter compared to the adjacent end of its body portion, said pouring end external surface being threaded to receive an internally threaded closure cap.

6. A closure fitting means according to claim 1 wherein said locking-compression ring has an outwardly projecting annular flange at its end.

7. In combination, a closure fitting means and a thin-walled flexible container having a thin-walled frustoconical tubular neck, said closure fitting means comprising:
   a pour-spout having a body portion whose outer surface is frustoconical corresponding with said thin-walled frustoconical tubular neck and a pouring end adapted to receive a closure;
   said pour-spout having an external diameter greater than said thin-walled frustoconical tubular neck which is stretchably received thereover;
   a locking-compression ring having a frustoconical inner surface corresponding to the frustoconical outer surface of said pour-spout and said thin-walled frustoconical tubular neck;
   said pour-spout, said thin-walled tubular neck and said locking-compression ring having their larger frustoconical ends toward the container;
   said locking-compression ring being forced onto said pour-spout body portion having the thin-walled frustoconical shaped tubular neck stretched thereover whereupon there is a uniform radial compression of the thin-walled tubular neck forming a leak-proof seal between said thin-walled tubular neck and said pour-spout body portion and said locking-compression ring.

8. The combination according to claim 7, wherein said pour-spout body portion has a lock receiving means extending into the outer surface thereof adjacent its end away from said container and wherein said locking-compression ring has an inwardly projecting locking means on its inner surface for reception in said lock receiving means on the body portion of the pour-spout.

9. The combination according to claim 8, wherein the body portion of the pour-spout outer surface, the thin-walled frustoconical tubular neck and the locking ring inner surface have their frustoconical matching surfaces tapering at an angle of approximately 1 ½°.

10. The combination according to claim 9 wherein the pouring end of the pour-spout has a threaded portion to receive a threaded closure member.